US010723853B2

(12) United States Patent
Turanski et al.

(10) Patent No.: US 10,723,853 B2
(45) Date of Patent: Jul. 28, 2020

(54) USE OF INORGANIC PARTICLES TO PRODUCE A BARRIER LAYER ON AIRCRAFT COMPONENTS

(71) Applicant: Airbus Operations GmbH, Hamburg (DE)

(72) Inventors: Peter Turanski, Suestedt (DE); Heinz-Peter Busch, Weyhe (DE); Berend Schoke, Twistringen (DE); Wilko Östereich, Syke-Barrien (DE)

(73) Assignee: Airbus Operations GmbH (DE)

( * ) Notice: Subject to any disclaimer, the term of this patent is extended or adjusted under 35 U.S.C. 154(b) by 58 days.

(21) Appl. No.: 15/951,398

(22) Filed: Apr. 12, 2018

(65) Prior Publication Data

US 2018/0230281 A1 Aug. 16, 2018

Related U.S. Application Data

(60) Division of application No. 13/456,549, filed on Apr. 26, 2012, now abandoned, which is a continuation of application No. PCT/EP2010/064999, filed on Oct. 7, 2010.

(60) Provisional application No. 61/255,220, filed on Oct. 27, 2009.

(30) Foreign Application Priority Data

Oct. 27, 2009 (DE) .................. 10 2009 050 787

(51) Int. Cl.
| | | |
|---|---|---|
| *C08J 5/24* | (2006.01) | |
| *B29C 70/58* | (2006.01) | |
| *B32B 3/12* | (2006.01) | |
| *B32B 5/02* | (2006.01) | |
| *B32B 29/02* | (2006.01) | |

(52) U.S. Cl.
CPC .............. *C08J 5/24* (2013.01); *B29C 70/585* (2013.01); *B32B 3/12* (2013.01); *B32B 5/02* (2013.01); *B32B 5/024* (2013.01); *B32B 29/02* (2013.01); *B32B 2250/40* (2013.01); *B32B 2255/02* (2013.01); *B32B 2255/20* (2013.01); *B32B 2260/021* (2013.01); *B32B 2260/046* (2013.01); *B32B 2264/104* (2013.01); *B32B 2307/306* (2013.01); *B32B 2307/3065* (2013.01); *B32B 2605/003* (2013.01); *B32B 2605/18* (2013.01); *Y02T 50/43* (2013.01); *Y10T 428/251* (2015.01)

(58) Field of Classification Search
None
See application file for complete search history.

(56) References Cited

U.S. PATENT DOCUMENTS

| | | | |
|---|---|---|---|
| 4,110,095 A | 8/1978 | Owens-Illinois | |
| 4,284,679 A | 8/1981 | Blad et al. | |
| 4,818,319 A | 4/1989 | Beer et al. | |
| 5,595,817 A | 1/1997 | Schafer et al. | |
| 2002/0192360 A1* | 12/2002 | Seaver ................ | B05B 13/0228 427/58 |
| 2003/0170418 A1 | 9/2003 | Mormont et al. | |

FOREIGN PATENT DOCUMENTS

| | | |
|---|---|---|
| DE | 35 14 879 A1 | 10/1986 |
| DE | 4420613 C1 | 8/1995 |
| DE | 102005047710 A1 | 3/2007 |
| DE | 202009003329 U1 | 6/2009 |
| EP | 0196493 A2 | 10/1986 |
| JP | 01078946 A | 3/1989 |

OTHER PUBLICATIONS

International Search Report for PCT/EP2010/064999 dated Dec. 12, 2010.
Chemical Abstracts Service, Columbus, Ohio, US; May 12, 1984 (May 12, 1984), Asnovich, L. Z. et al: "Electrically insulating tape", XP002612558, found in the STN Database accession No. 1984:157932 Summary -& SU 878 081 AI (USSR) Dec. 15, 1983 (Dec. 15, 1983 ).

* cited by examiner

*Primary Examiner* — Shamim Ahmed
*Assistant Examiner* — Bradford M Gates
(74) *Attorney, Agent, or Firm* — Lerner, David, Littenberg, Krumholz & Mentlik, LLP

(57) ABSTRACT

A plastics material component for an aircraft includes (i) a substrate, which comprises one or more thermosetting plastics materials, and (ii) one or more layers which are applied to the substrate, at least one layer S1 comprising mica. A method for producing the plastics material component includes providing a substrate including at least one thermosetting plastics material or one polymer which is cross-linked to form a thermosetting plastics material, and applying one or more layers to the substrate, wherein at least one layer includes mica. The mica-containing layer is applied directly to the substrate and the application is carried out before and/or during the curing of the thermosetting plastics material.

3 Claims, No Drawings

USE OF INORGANIC PARTICLES TO PRODUCE A BARRIER LAYER ON AIRCRAFT COMPONENTS

CROSS-REFERENCE TO RELATED APPLICATIONS

The present application is a divisional of U.S. patent application Ser. No. 13/456,549, filed on Apr. 26, 2012, which is a continuation of International Application No. PCT/EP2010/064999 filed Oct. 7, 2010, which claims the benefit of the filing date of U.S. Provisional Patent Application No. 61/255,220, filed on Oct. 27, 2009 and of German Patent Application No. 10 2009 050 787.6, filed Oct. 27, 2009, all of which are incorporated herein by reference.

BACKGROUND OF THE INVENTION

The present invention relates to a method for producing plastics material components having a mica-containing barrier layer and to the use thereof as aircraft components having improved fire behaviour.

BRIEF SUMMARY OF THE INVENTION

The proportion of plastics materials in aircraft construction is increasing continuously. In this context, the behaviour of plastics materials in the event of fire is a decisive criterion when selecting the matrix materials and the reinforcing fibres.

The plastics materials used in aircraft have to meet high requirements with regard to the burn-through and flame propagation properties. At the same time, these materials have to meet particular mechanical requirements and should also be of the lowest possible weight. In many plastics materials, these properties conflict, in such a way that for example the weight or the mechanical properties are optimised at the cost of the fire behaviour. Conversely, optimising the fire behaviour often leads to expensive and heavy constructions.

In principle, it is known to use mica particles in the form of mica paper as a fire protection component in primary insulations for aircraft. In this context, the mica paper is introduced between two foils, forming a multilayer mica-containing laminate. Together with glass wool, the laminate can then be used as an insulation system for improving the burn-through properties in an aircraft.

Nowadays, the fire requirements are also met by using intrinsically fibre retardant plastics materials or plastics materials of which the fire behaviour has been optimised by adding flame retardants.

It is further known to apply plastics material barrier layers in the form of metal foils such as aluminium foils, in particular in a fibre composite construction. However, the use of metal foils of this type as barrier layers has some drawbacks, such as lower heat resistance (lower barrier effect at high temperatures), corrosion, or undesirable electrical conductivity.

In the light of the above, it is an object of the present invention to provide plastics material-containing components for an aircraft (for example the pressurised air space of an aircraft) which exhibit the best possible fire behaviour, for example high burn-through time, low flammability or low smoke density, but at the same time allow the greatest possible flexibility in the selection of suitable plastics materials to optimise the weight and/or mechanical properties. It is also desirable to be able to use inexpensive materials and produce components by a simple, cost-effective method.

DETAILED DESCRIPTION

This object is achieved by providing a plastics material component for an aircraft, comprising
(i) a substrate, which comprises one or more thermosetting plastics materials, and
(ii) one or more layers which are applied to the substrate, at least one layer S1 comprising mica.

The mica-containing layer S1 (also referred to as a barrier layer hereinafter) is distinguished by extremely high heat resistance and an excellent barrier effect in the event of fire. The thermal release of plastics material components is delayed significantly, leading inter alia to an improvement in smoke density, quantity of toxic fire gas constituents, release of heat, flammability and burn-through properties (for example of structural components and/or in the hold).

In the context of the present invention, the term "thermosetting plastics material" is used in the conventional meaning familiar to the person skilled in the art, and refers to a plastics material which, after curing, can no longer be deformed or melted and takes the form of a relatively rigid polymeric material.

The thermosetting plastics material is preferably selected from an epoxy resin, a phenolic resin, a polyester resin, in particular an unsaturated polyester resin, a triazine resin, a biopolymer resin, preferably one formed from renewable organic starting materials (such as a polyfurfuryl alcohol resin) or a mixture of these resins.

In the context of the present invention, the terms "epoxy resin", "phenolic resin", "triazine resin" and "polyester resin" are to be understood to the effect that there may also be at least a particular content of other comonomer units in addition to the monomer units typical of these resins.

In a preferred embodiment, the substrate is a composite. In the context of the present invention, the term "composite" is used in the conventional meaning familiar to the person skilled in the art, and thus refers to a material comprising a polymer matrix and reinforcing fibres provided therein. The polymer matrix preferably contains at least one thermosetting plastics material. Suitable thermosetting plastics materials include the foregoing, i.e. the thermosetting plastics material is preferably an epoxy resin, a phenolic resin, a polyester resin, in particular an unsaturated polyester resin, a triazine resin, a biopolymer resin, preferably one formed from renewable organic starting materials (such as a polyfurfuryl alcohol resin), or a mixture of these resins.

Suitable reinforcing fibres for the composite include conventional fibres known to the person skilled in the art. The reinforcing fibres are preferably selected from glass fibres, carbon fibres, natural fibres, polyethylene fibres, in particular highly drawn polyethylene fibres, aramid fibres, or combinations of these fibres.

As stated previously, one or more layers is/are applied to the substrate, at least one layer S1 comprising mica.

In the context of the present invention, the types of mica familiar to the person skilled in the art may be used, for example phlogopite, muscovite, fluorophlogopite, micanite, or mixtures thereof. Preferred mica types are phlogopite, muscovite or mixtures thereof.

Micas are layered silicates, which are generally of platelet-type crystal morphology. To optimise the fire behaviour of the mica-containing barrier layer to the greatest possible extent, the mica is preferably orientated parallel to the substrate surface in the layer S1, i.e. the mica particles are preferably aligned as uniformly as possible. This may be achieved for example using suitable methods of application, which are described in greater detail hereinafter.

The mica content of the layer S1 is preferably at least 80% by weight, more preferably at least 90% by weight, most preferably at least 95% by weight. In the context of the present invention, it is also possible for the layer S1 to consist entirely of mica.

Depending on the requirements, the layer S1 may be applied directly to the substrate, or alternatively a further layer may be provided between the layer S1 and the substrate. If a further layer is applied between the layer S1 and the substrate, this further layer may preferably comprise an adhesive. The layer S1 is preferably applied directly to the substrate, i.e. the mica is in direct contact with the substrate surface.

In the context of the present invention, the mica-containing layer S1 may be provided only on one side of the surface of the substrate or alternatively on the front and back of the substrate.

The mica is preferably provided in an amount of <50 g/m² substrate surface, more preferably <30 g/m² substrate surface, most preferably <10 g/m² substrate surface. The minimum amount of mica on the substrate surface may be, for example, 25 g/m² or 15 g/m² or even 5 g/m² substrate surface.

In a further aspect of the present invention, an aircraft component is provided which comprises the above-described plastics material component.

These aircraft components may be, for example, cabin components, hold linings, electrical and/or electronic assemblies, components in the pressurised-air space, wing components or fuselage components.

In a further aspect, the present invention relates to a method for producing the above-described plastics material component, comprising providing a substrate, which comprises at least one thermosetting plastics material or at least one polymer which may be crosslinked to form a thermosetting plastics material, and applying one or more layers to the substrate, at least one layer S1 comprising mica.

Suitable thermosetting plastics materials and mica types include those mentioned hereinbefore.

The term "polymer which may be crosslinked to form a thermosetting plastics material" refers to the precursor, which is yet to be cured, of the thermosetting polymer, i.e. of the thermosetting plastics material which is yet to be cured.

In principle, the layer or layers can be applied to the substrate, which is preferably a composite, before, during and/or after the curing of the thermosetting plastics material. In a preferred embodiment, the mica-containing layer S1 is applied directly to the substrate, and the layer S1 is applied before and/or during the curing of the thermosetting plastics material. In this state where it is yet to be cured, the polymer resin is still tacky and can therefore promote the fixing of the layer(s) to the substrate surface.

For example, the substrate may be produced or provided in the form of a prepreg. The layer S1 comprising the mica is preferably applied at a time when the plastics material has not yet cured or has not yet finished curing. In this way, the layer S1 is fixed or firmly connected to the substrate during the curing step of the thermosetting plastics material. In the context of the present invention, the term "prepreg" is used in the conventional meaning familiar to the person skilled in the art, and thus refers to a semi-finished product consisting of fibres, preferably continuous fibres, and an uncured thermosetting polymer matrix.

In the method according to the invention, the mica may be applied to the substrate in a particulate form or in a form which is fixed in advance, in particular in the form of a mica paper.

The term "mica paper" is used in the conventional meaning familiar to the person skilled in the art. Mica paper is understood to mean a sheet which is produced by conventional paper production methods and predominantly comprises mica particles, generally in the form of orientated platelet-shaped particles. Mica paper is commercially available with and without binder.

To fix the mica paper to the substrate, an adhesive layer may be applied to the substrate surface in advance. Alternatively, the mica paper may be brought into contact with the substrate surface before or during the curing of the thermosetting plastics material, i.e. at a time when the resin still has some tackiness. The mica paper is then definitively fixed to the substrate during the subsequent curing of the thermosetting plastics material.

In a preferred embodiment, the mica-containing layer S1 is applied to the substrate by an electrostatic application method. In this preferred method, the mica and/or the substrate surface may be electrostatically charged. In a preferred variant, a mica layer is applied to a foil and held on the foil surface by electrostatic interactions, and the mica layer is subsequently transferred to the substrate or a layer provided on the substrate, preferably in that the surface of the substrate or the layer provided on the substrate is adhesive, and the mica layer provided on the foil adheres to the surface of the substrate or to the layer after being brought into contact therewith. The mica layer on the foil is preferably transferred to the substrate, which is provided, for example, as a prepreg, in that this mica layer is brought into contact with the substrate before and/or during the curing of the thermosetting plastics material.

With this electrostatic application method, a foil is preferably initially electrostatically charged (for example by friction), and the mica is then applied to the foil, for example by scattering mica powder/flakes, i.e. by particle application. Mica particles which are not in direct contact with the electrostatically charged foil surface may be removed again, for example by shaking these particles off the foil in an appropriate manner.

In this way, a foil having a very thin, ideally single-ply mica particle layer is initially obtained.

In a next step, this foil is brought into contact with the substrate surface and the mica particle layer is transferred onto the substrate surface. This is preferably achieved in that the substrate surface still has some tackiness, for example in that the foil is brought into contact with the substrate surface before or during the curing of the thermosetting plastics material and thus the resin still has some tackiness. Alternatively, an adhesive layer can be applied to the substrate surface after the curing of the thermosetting plastics material, and the electrostatically charged foil, provided with a mica layer, can be brought into contact with this adhesive layer.

With an electrostatic application method of this type, a very thin yet densely packed mica particle layer, having a distinct uniform orientation of the particles, can be produced on the substrate.

As stated previously, it is also possible in the context of the present invention to scatter the mica onto the substrate in particulate form. In this context, it is preferred for an adhesive layer to be applied to the substrate, or alternatively for the scattering to be carried out before and/or during the curing of the thermosetting plastics material. Better orientation of the mica particles can be achieved in that the applied mica layer is subjected to a pressure, preferably perpendicular to the layer surface.

In the context of the present invention, materials having fire behaviour which intrinsically prevents the use thereof in vulnerable aircraft regions can be used by virtue of the application of the mica-containing layer S1.

The component properties can be improved by exchanging materials. Thus for example the use of aramid fibres in the thermosetting plastics material leads to better impact properties. A plastics material component of this type comprising aramid fibres can for example preferably be used in hold linings.

The targeted exchange of materials in the substrate, which is made possible by the application of the mica-containing layer S1, results in improved electrical insulation properties and optimised corrosion properties at Al/CFRP contact points.

As stated previously, in the context of the present invention, polyester resins can be used as thermosetting plastics materials in the substrate, leading to a cost reduction. Polyethylene fibres (PE fibres) may also be used instead of glass fibres, for example in the cockpit door, making it possible to achieve a weight reduction.

In a further aspect, the present invention relates to the use of the above-described plastics material component as an aircraft component, which is preferably selected from cabin components, hold linings, electrical and/or electronic assemblies, components in a pressurised-air space, wing components and/or fuselage components.

The invention will be explained in greater detail by way of the following examples.

EXAMPLES

The substrates used in the examples are samples having the following sandwich construction:
epoxy resin and glass fabric prepreg
nomex honeycomb
epoxy resin and glass fabric prepreg The mica is applied to this substrate either in the form of a mica paper or as mica powder (or mica flakes), as follows:

Application of the Mica Paper:

Lay sample construction comprising prepregs and mica paper directly on the surface (on one side); cure sample between separating foil: 125° C., 60 minutes, 3 MPa.

Application of the Mica Flakes:

Variant 1: Statically charge Tedlar® separating foils by rubbing a woollen rag on the foil; scatter mica sufficiently on the horizontal foil; hold foil vertically and shake carefully; the mica particles remain in direct contact with the foil.

Variant 2: Spray prepreg with solvent (increase tackiness); scatter mica particles and shake.

The samples were measured for flammability, smoke density and toxicity.

The flammability was found to be improved by up to 25%.

The smoke density was found to be improved by up to 65%.

The toxicity (HCl) was found to be improved by up to 70%.

These figures are based on a comparison between sandwich constructions with and without mica.

The invention claimed is:

1. A method for producing a plastics material component for an aircraft comprising (i) a substrate, comprising one or more thermosetting plastics materials, and (ii) one or more layers applied to the substrate, at least one layer comprising mica, the method comprising:
   providing a substrate, comprising at least one thermosetting plastics material or one polymer which is cross-linked to form a thermosetting plastics material, and
   applying one or more layers to the substrate, at least one layer comprising mica;
   wherein the mica-containing layer is applied directly to the substrate and the application is carried out before and/or during the curing of the thermosetting plastics material, and
   wherein the mica-containing layer is applied to the substrate by an electrostatic application method, and
   wherein a mica layer is applied to a foil and held on the foil surface by electrostatic interactions, and the mica layer provided on the foil is subsequently transferred to the substrate to form the mica-containing layer.

2. The method according to claim 1, wherein the substrate is in the form of a prepreg.

3. The method according to claim 1, wherein the substrate is provided in the form of a prepreg which already comprises a mica-containing layer.

* * * * *